Patented May 5, 1925.

1,536,416

UNITED STATES PATENT OFFICE.

RICHARD BISCHOFF, OF DUSSELDORF, GERMANY.

STEEL-HARDENING PROCESS.

No Drawing.    Application filed March 26, 1924.    Serial No. 701,959½.

*To all whom it may concern:*

Be it known that I, Dr. RICHARD BISCHOFF, a citizen of the Republic of Germany, residing at Dusseldorf, Germany, have invented new and useful Improvements in Steel-Hardening Processes, of which the following is a specification.

This invention has reference to a process for the hardening of the parts of shafts and the like subject to wear and strain such as journal bearings, pivots, studs and the like, and among other modes of application the invention refers to crank shafts of air hardening steel.

It is usual in the manufacture of crank shafts made from air hardening steel, which are for instance used for the construction of motor engines for automobiles and aeroplanes and the like to impart to such shafts a tensile strength of say about 140,000 pounds per square inch. It is not usual to impart any considerably higher strength to the material for the reason of the likelihood of detracting thereby from the elongation and of the possibility of the occurrence of ruptures of the shafts particularly at the crank arms in view of their being subject to much torsional stress. For the purpose, however, of imparting to a shafting an increased hardness in spite thereof, and consequently a greater resistibility against wear the journaling and bearing portions only are treated in accordance with the process of this invention thereby arriving at a hardening of the bearings of the shafting without hardening said shafting itself.

Broadly speaking the process according to this invention resides in the fact that shafts of air hardening steel after having been tempered and treated in the ordinary manner to a tensile strength of about 140,000 pounds per square inch are submitted to a hardening heat of about 800 degree centigrade (bright red) by the action of a jet of flame of a welding burner only at those points which are to be brought to a special hardness, the said treated portions being then cooled at the open air without being chilled in a liquid medium.

In order to insure the pieces of work to be as free from warping as possible during the treatment, the said material is rapidly rotated between the supporting points of a lathe during the heating and during the cooling thereof. By means of the uninterrupted rapid rotating of the shafts around the longitudinal axis of the parts to be hardened the action of the welding burner is effectuated on the whole extent of the respective part in a way that the part is heated in an absolute equal manner all around and throughout, and so finally an absolute equal heating of the respective part is obtained throughout.

The cooling is likewise effectuated in an absolute equal manner, by further continuing the rotation, and so the air-hardening of the heated bearing and journaling portions of crank shafts is obtained without any warping or bending of the shaft or its hardened portions in their longitudinal axis.

The shafts treated in accordance with the working process above described show a strength of about 200,000 pounds per square inch (Brinell—number 410–430 at 2.9 to 3 millimeters spherical diameter) at the bearing ponts. This is a strength resulting in an excellent resistibility against wear. The hardness and strength obtained in this manner is not merely superficial, inasmuch as by the hardening process at the points treated a martensitic texture of the steel is obtained throughout.

The safety of operation of the shafts is not interfered with by the hardening of the bearing and journaling portions. Tests made with four-cylinder-crank shafts treated according to the new process have shown that in crank shafts which had been curved in the hydraulic press the bearing portions remained unchanged, and that neither ruptures nor fissures or superficial fractures occurred upon the transition portions from the running portions to the crank shaft arm.

The invention has been set forth merely in its broad aspects, and it is evident that it is susceptible of such modifications as will suggest themselves for the convenience of the operator and its adaptation to various uses.

I claim:—

The process of hardening wearing portions of shaftings made of air hardening chrome-nickel-steel, which process consists in rapidly rotating said shaftings and at the same time heating the wearing portions to approximately 800 degrees centigrade, and then cooling said portions at continued rotation in the open air.

In testimony whereof I have signed my name to this specification.

Dr. RICHARD BISCHOFF.